(12) United States Patent
Christensen et al.

(10) Patent No.: US 11,594,259 B1
(45) Date of Patent: Feb. 28, 2023

(54) SIMPLIFYING DIGITAL CONTENT LAYERS OF AN EDITING SEQUENCE

(71) Applicant: Adobe Inc., San Jose, CA (US)

(72) Inventors: Matt Christensen, Los Angeles, CA (US); Eric Sanders, San Jose, CA (US); Zachariah Nelson, Mounds View, MN (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/520,371

(22) Filed: Nov. 5, 2021

(51) Int. Cl.
*G11B 27/036* (2006.01)
*G11B 27/034* (2006.01)
*G11B 27/34* (2006.01)

(52) U.S. Cl.
CPC .......... *G11B 27/036* (2013.01); *G11B 27/034* (2013.01); *G11B 27/34* (2013.01)

(58) Field of Classification Search
CPC ...... G11B 27/036; G11B 27/034; G11B 27/34
See application file for complete search history.

(56) References Cited

U.S. PATENT DOCUMENTS

| | | | | |
|---|---|---|---|---|
| 2007/0189708 A1* | 8/2007 | Lerman | ................ | G11B 27/034 386/280 |
| 2014/0366049 A1* | 12/2014 | Lehtiniemi | ...... | H04N 21/44218 725/12 |

* cited by examiner

*Primary Examiner* — Thai Q Tran
*Assistant Examiner* — Jose M Mesa
(74) *Attorney, Agent, or Firm* — NDWE LLP

(57) ABSTRACT

Embodiments are disclosed for simplifying digital content layers of an editing sequence. In particular, in one or more embodiments, the disclosed systems and methods comprise receiving an input including an editing sequence and a configuration for modifying the editing sequence, the editing sequence including a set of video layers, wherein a rendering of the set of video layers by a rendering engine produces a rendered video sequence, analyzing the set of video layers, including video segments present on the set of video layers, determining a first subset of the video segments present on the set of video layers relevant to the rendering of the set of video layers, determining modifications to the set of video layers of the editing sequence based on the determined first subset of the video segments and the received configuration, and automatically applying the determined modifications to the set of video layers of the editing sequence.

20 Claims, 10 Drawing Sheets
(5 of 10 Drawing Sheet(s) Filed in Color)

SIMPLIFYING DIGITAL CONTENT LAYERS OF AN EDITING SEQUENCE

BACKGROUND

Computing devices (e.g., computers, tablets, smart phones) provide numerous ways for users to capture, create, share, view, and otherwise edit numerous types of digital content (e.g., digital images and digital videos). One example is the combining numerous types of digital content (e.g., digital video, digital audio, and digital images) that are rendered using an editing application to create a multimedia sequence. These multimedia sequences can be created by adding and modifying digital content in a multimedia editing sequence. However, multimedia editing sequences can grow in significant complexity as multiple layers of digital content are added. For example, they can become littered with segments or clips of digital content and/or other elements (e.g., layers, transitions, etc.) that are not relevant to the rendering process. The visual clutter can make it difficult to understand which layers and segments are being used and how they are being used to generate the multimedia sequence.

These and other problems exist with regards to managing complex multimedia editing sequences.

SUMMARY

Introduced here are techniques/technologies that allow a digital design system to simplify layers of an editing sequence. An editing sequence, or video timeline, includes a collection of segments (e.g., audio and/or video) starting at a beginning of a video sequence (e.g., a time zero) to an end of the video sequence. The editing sequence can include a plurality of stacked layers that can visually represent segments or other elements that are composited to generate some or all of the frames of the video sequence. The digital design system can receive an editing sequence and a user-defined configuration or settings for modifying the editing sequence. Based on the user-defined configuration, the digital design system can generate a simplified version of the editing sequence based on determining the segments of the editing sequence that are relevant to the rendering of the layers of the editing sequence to generate the video sequence. Generating the simplified version of the editing sequence can include removing sequence markers, disabled clips, through edits, etc. and closing vertical gaps so that the layers of the editing sequence can be collapsed into as few video layers and audio layers as possible without altering the rendered sequence. By modifying editing sequences by considering the segments of the editing sequence that are relevant to the rendering of the layers of the editing sequence, embodiments of the present disclosure provide benefits and/or solve one or more of the foregoing or other problems in the existing systems.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

One or more embodiments of the present disclosure include a digital design system for simplifying digital content layers of an editing sequence. While there are existing systems that can reduce the number of layers of an editing sequence, they have their disadvantages and limitations. For example, one existing solution provides options to disable unused clips, change the color of unused segments, delete unused clips segments and flatten the segments down to as few layers/tracks as possible. However, this solution cannot distinguish between layers that are locked and unlocked, and thus can destroy the original intent of the creator by removing or altering locked layers, including any segments arranged on locked layers. These existing solutions also cannot remove segments based on criteria (e.g., color, offline status, disabled status, etc.), empty layers, disabled layers, or transitions. Further, these solutions typically operate on the original editing sequence, resulting in the original editing sequence not being preserved.

To address these issues, after receiving an editing sequence as an input, the digital design system generates a duplicate of the editing sequence upon which the simplification process will be applied. The digital design system then analyzes a set of layers of the editing sequence. The set of layers can include a set of video layers and/or audio layers, where the video layers include video segments, and the audio layers include audio segments. The digital design system then determines how to apply modifications to the set of video layers and/or audio layers of the editing sequence based on its analysis of the video and audio layers and a user-defined configuration that indicates specific layers and segments to remove. The digital design system then applies the modified to the editing sequence and provides the modified editing sequence.

Figure 1:
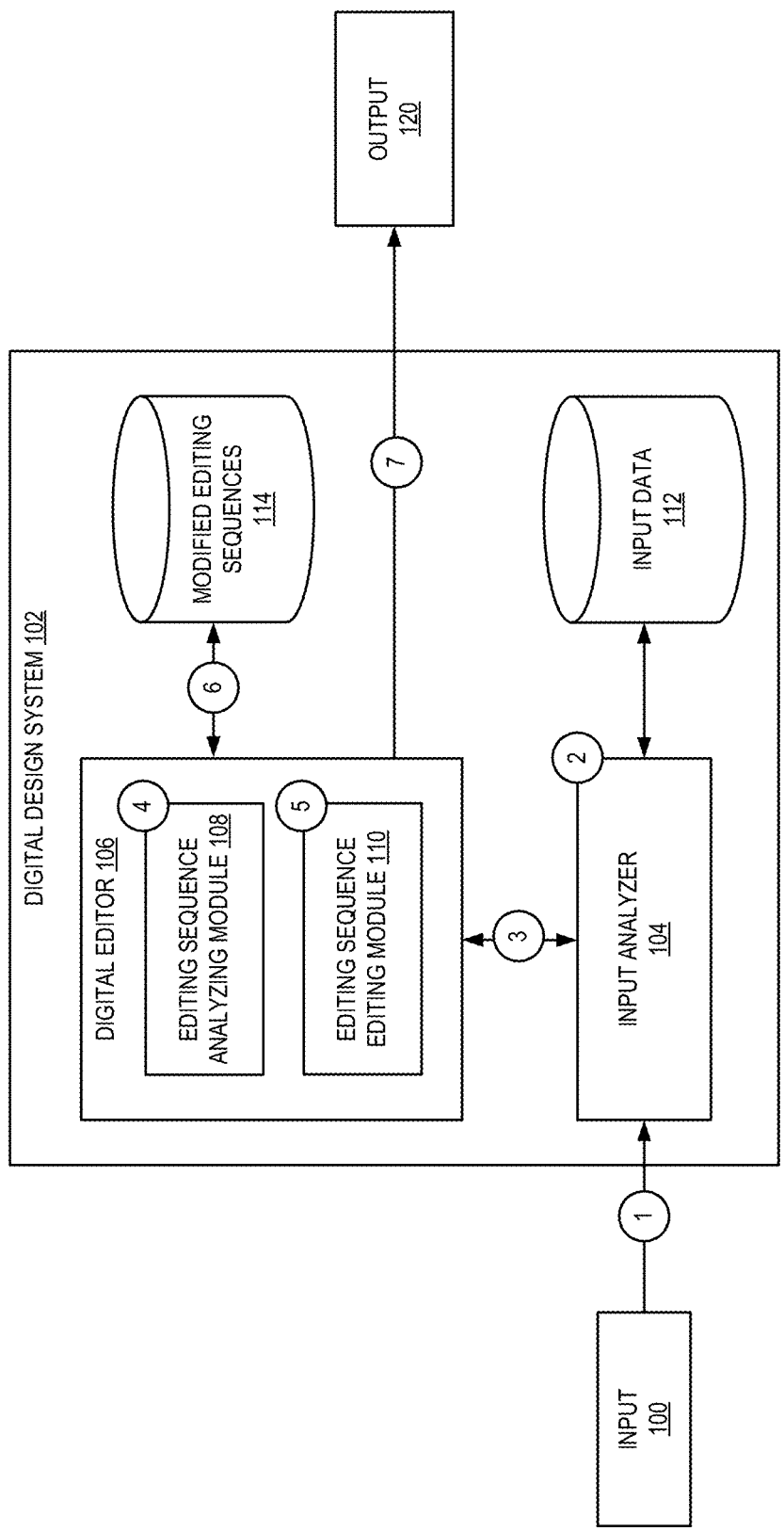
FIG. 1 illustrates a diagram of a process of simplifying the digital content layers of an editing sequence in accordance with one or more embodiments.

FIG. 1 illustrates a diagram of a process of simplifying the digital content layers of an editing sequence in accordance with one or more embodiments. As shown in FIG. 1, in one or more embodiments, a digital design system 102 receives an input 100 as part of a request to simplify an editing sequence, as shown at numeral 1. In one or more embodiments, the input 100 includes at least an editing sequence. For example, the digital design system 102 receives the editing sequence from a user via a user device or a computing device. In one or more embodiments, a user may select a file including the editing sequence in a video editing application or provide information indicating a location of the editing sequence (e.g., a file location or URL). In another example, a user may submit files including the editing sequence to a web service or an application configured to receive editing sequences as inputs.

The input 100 can also include configuration data, including user-selected options to be used in modifying the editing sequence. In one or more embodiments, the configuration data can be submitted separately from the editing sequence in a subsequent input to the digital design system 102. In one or more embodiments, the digital design system 102 includes an input analyzer 104 that receives the input 100.

In one or more embodiments, the input analyzer 104 analyzes the input 100, as shown at numeral 2. In one or more embodiments, the input analyzer 104 analyzes the input 100 to identify the editing sequence. In one or more embodiments, when the input 100 includes configuration data and/or when the input 100 includes information indicating the location of the editing sequence, the input analyzer 104 can extract the editing sequence from the input 100 or retrieve the editing sequence from the location. The input analyzer 104 can further generate a copy of the editing sequence to be used by the digital editor 106.

In one or more embodiments, after the input analyzer 104 generates the copy of the editing sequence, respectively, the copy of the editing sequence is sent to the digital editor 106, as shown at numeral 3. The input analyzer 104 can also send the configuration data to the digital editor 106. In one or more other embodiments, the input analyzer 104 stores the editing sequence and/or the copy of the editing sequence in a memory or storage (e.g., input data database 112) for later access by the digital editor 106.

In one or more embodiments, an editing sequence analyzing module 108 of the digital editor 106 analyzes the editing sequence, as shown at numeral 4. The editing sequence can include layers of digital content (e.g., digital video, digital audio, digital images, etc.), including one or more types of digital content. In one example, the editing sequence includes a set of video layers and a set of audio layers.

Figure 2:
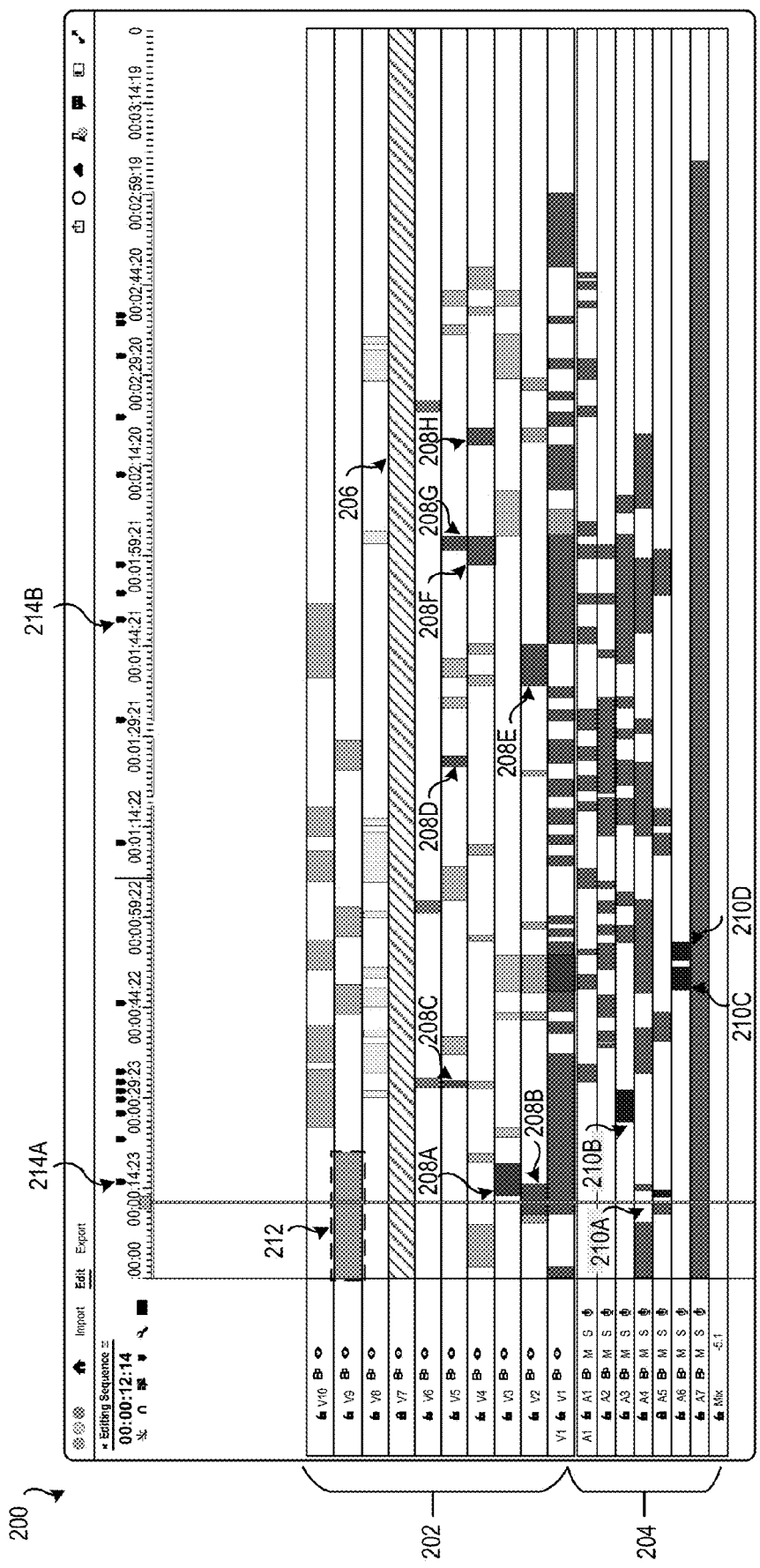
FIG. 2 illustrates an example input editing sequence in accordance with one or more embodiments.

FIG. 2 illustrates an example input editing sequence in accordance with one or more embodiments. The input editing sequence 200 includes a plurality of video layers 202 and a plurality of audio layers 204, with a plurality of video segments placed across the plurality of video layers 202 and a plurality of audio segments placed across the plurality of audio layers 204. As illustrated in FIG. 2, the input editing sequence 200 includes ten video layers and eight audio layers. Other input editing sequences can include dozens or hundreds of tracks. Video layer 206 is a locked layer, which can be user-defined to indicate that video layer 206 should not be altered. The input editing sequence 200 also includes a plurality of disabled video segments (e.g., video segments 208A-H) and a plurality of disabled audio segments (e.g., audio segments (e.g., audio segments 210A-D). The disabled video and audio segments may be artifacts of an editor experimenting with different segments that were ultimately marked as disabled or muted. In one or more embodiments, the disabled video and audio segments can be visualized as darkened segments in input editing sequence 200.

In one or more embodiments, as part of analyzing the editing sequence, the editing sequence analyzing module 108 can determine or identify the video and audio segments that are relevant to the rendering process. In one or more embodiments, video and audio segments are relevant to the rendering process when they are utilized by a rendering engine to generate the rendered output. The video and audio segments that are determined to not be relevant to the rendering process can be flagged by the editing sequence analyzing module 108. These can include disabled video segments and video segments completely obscured by another video segment on a higher layer of the editing sequence. In one or more embodiments, when rendering frames of an editing sequence where there is a plurality of video layers, the segments that will ultimately be utilized for rendering the video sequence is determined top-down through the plurality of video layers. Thus, a video segment at a higher level that is present through a first set of frames may be relevant to the rendering process and all video segments at lower levels may not be relevant through the first set of frames, depending on an opacity of the video segment at the higher level. For example, video segment 212 at video layer nine is first video segment seen for approximately the first 20 seconds of frames in the input editing sequence 200. If video segment 212 is completely opaque, the video segments in video layers 1-4 may not be relevant to the rendering process of the editing sequence 200, because they would be completely masked or obscured by video segment 212 on a higher video layer of the editing sequence and thus would not be used by the rendering engine to generate the rendered video sequence. Conversely, if video segment 212 has some transparency, then one or more of the video segments in video layers 1-4 may be relevant to the rendered video sequence, and for some frames, the rendered video sequence would be a composite of video segment 212 and one or more video segments at the lower levels.

Figure 3:
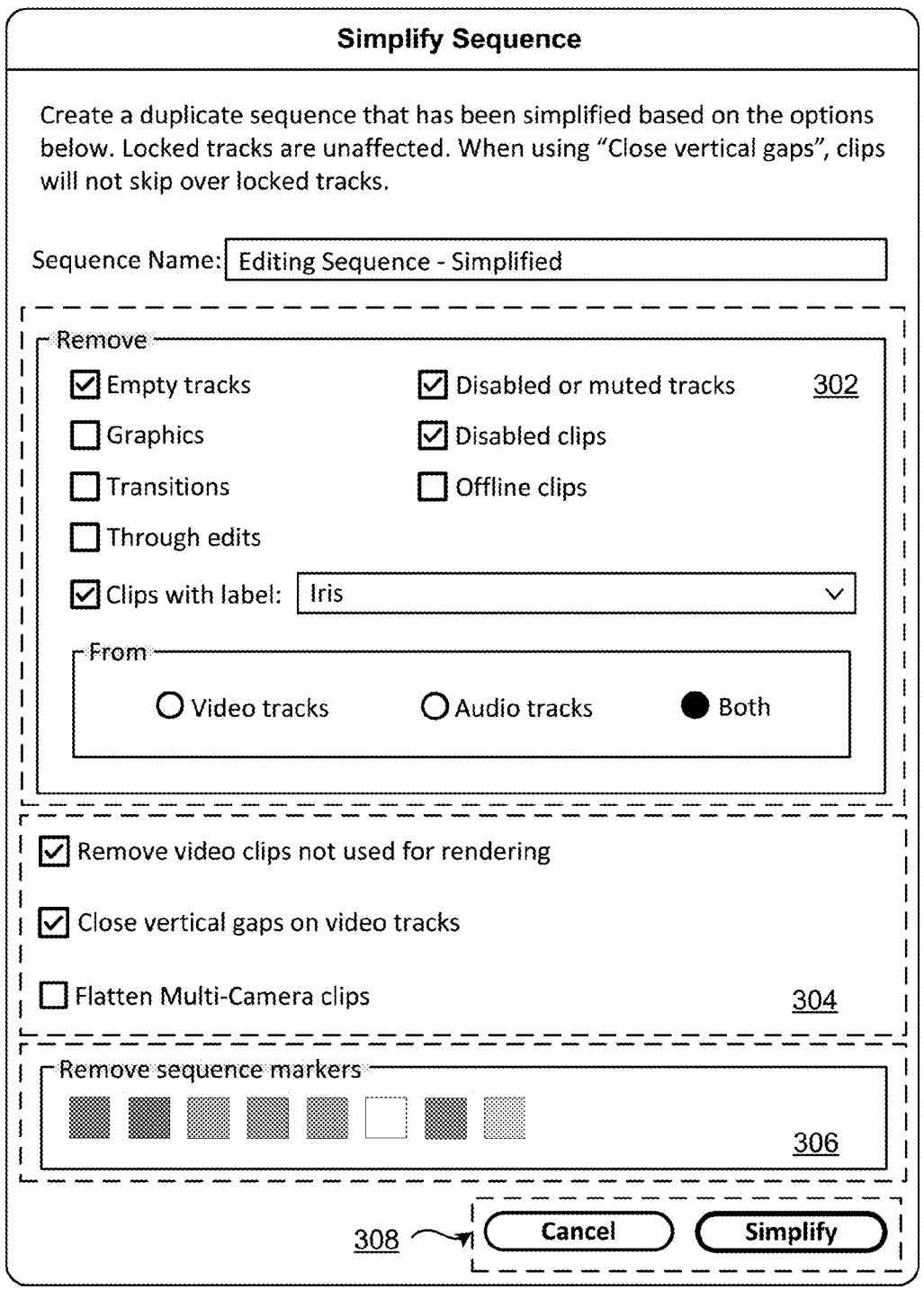
FIG. 3 illustrates an example user interface for providing configuration data for modifying an editing sequence in accordance with one or more embodiments.

In one or more embodiments, the editing sequence editing module 110 modifies the editing sequence based on its analysis and the configuration data received in the input 100, as shown at numeral 5. The configuration data can include user-defined actions for modifying the editing sequence. FIG. 3 illustrates an example user interface for providing configuration data for modifying an editing sequence in accordance with one or more embodiments. The user interface 300 can include a plurality of different options. Options 302 provide the user with the ability to select empty tracks, graphics, transitions, through edits, disabled or muted tracks, disabled clips, offline clips, and clips matching a user-inputted label, for removal. Transitions are effects added between segments/clips to create an animated link between them. Offline clips are segments/clips that either have been unlinked from its source file or a logged clip that has not yet been captured. Offline clips contain information about the source files they represent. Options 302 further provides user the option to select whether to apply the selected options to the video tracks/layers, the audio tracks/layers, or to both.

Removing through edits involves determining locations where an edit has been made to a video segment but where no frames of the video segment have been omitted. In one or more embodiments, when the editing sequence editing module 110 identifies a through edit, removed the through edit (e.g., joins the two video segments. For example, the video segment to the right of the through edit marker is removed and the video segment to the left of the through edit marker is extended to the location where the video segment to the right of through edit marker ended.

Options 304 provide the user with the ability to select whether to remove video clips not used for rendering the video sequence, close vertical gaps on video tracks/layers, and or flatten multi-camera clips/segments.

Closing vertical gaps involves the movement of a video segment from a current, higher video layer to a lowest video layer that has unused space to accommodate the video segment, where the moved video segment cannot skip over any other overlapping video segments at lower video layers. In one or more embodiments, the editing sequence editing module 110 first performs the selected operations in options 302 to remove the specified types of video segments. In one or more embodiments, the process of closing vertical gaps then starts at the next to lowest video layer. Starting from the first frame at time zero, the editing sequence editing module 110 identifies the first video segment on the layer and determines if there is any unused space in a lower video layer large enough for the first video segment. In one or more embodiments, the editing sequence editing module 110 determines whether the first video segment can fit based on the starting timecode and the ending timecode of the first video segment and the starting timecode and the ending timecode of the unused space. If the first video segment fits in the unused space, the first video segment is moved down. If the first video segment is part of a group of video segments or has a transition to another video segment, the first video segment is grouped with such other video segments and moved down to a lower layer, if possible, until any part of the group cannot be moved down further. The process then continues to the next video segment on the video layer until any video segments on the video layer have been processed and cannot be moved down to the lower video layer. After completing the next to last video layer, the editing sequence editing module 110 then performs the same operations on the next highest video layer, and so on, until the highest video layer is processed. After the video layers have been processed, the editing sequence editing module 110 then removes any empty tracks if the option was selected in options 302.

Flattening multi-camera clips/segments are when a single editing sequence represents video segments filmed simultaneously from multiple cameras (e.g., different angles of a subject). The video segments from the multiple cameras can be synced in the digital design system (e.g., based on timecodes) and can be displayed simultaneously to allow a user to select which video segment from one of the multiple cameras to display at a given frame. Selection of the flatten multi-camera clips/segments option in options 302 causes the editing sequence to be modified such that only the frames from the selected camera are included at any given time in the editing sequence.

Options 306 provide the user with the ability to remove sequence markers based on color. As illustrated in FIG. 2, sequence markers are distributed along the top of the editing sequence (e.g., labels 214A-B). Once the user has made their selections in the user interface 300, the user can either cancel or apply the selections to the editing sequence, by selecting the "Cancel" or "Simplify" interface elements (e.g., buttons 308), respectively.

As illustrated in FIG. 3, the options 302 selected for removal are "Empty tracks," "Disabled or muted tracks," "Disabled clips," and "Clips with label: Iris." Further, these selections are to apply to both video tracks and audio tracks. The options 304 selected are to "Remove video clips not used for rendering" and to "Close vertical gaps on video tracks."

In one or more embodiments, the editing sequence editing module 110 can maintain groupings and linkages established between segments. For example, if four video segments across three video layers are grouped together, regardless of the selected operations in the user interface 300, the editing sequence editing module 110 will maintain the distribution and spatial relationship of the four video segments across three video layers, even if the segments are collapsed to lower levels. In another example, if two or more video segments are linked together with transitions (e.g., dissolves, fadeouts, etc.) between video segments, the editing sequence editing module 110 will maintain the linkage between the video segments.

In one or more embodiments, the editing sequence editing module 110 can further remove any video segments from the video layers (e.g., video layers 202) that are not used in the rendering process of the editing sequence. For example, as described previously, if a video segment at a particular video layer is completely opaque, any video segments at video layers lower than the particular video layer that have a starting and ending timecode that is within the starting and ending timecode of the opaque video segment may not be relevant to the rendering and can be removed.

Returning to FIG. 1, in one or more embodiments, the digital design system 102 stores the modified editing sequence in a memory or storage location (e.g., modified editing sequences database 114) for later access by the user or the digital design system 102, as shown at numeral 6.

At numeral 7, the digital design system 102 returns an output 120 including the modified editing sequence to the user. In one or more embodiments, after the process described above in numerals 1-6, the output 120 is sent to the user or computing device that initiated the editing sequence simplification process with the digital design system 102, to another computing device associated with the user or another user, or to another system or application. For example, after the process described above in numerals 1-6, the modified editing sequence can be displayed in a user interface of a computing device.

Figure 4:
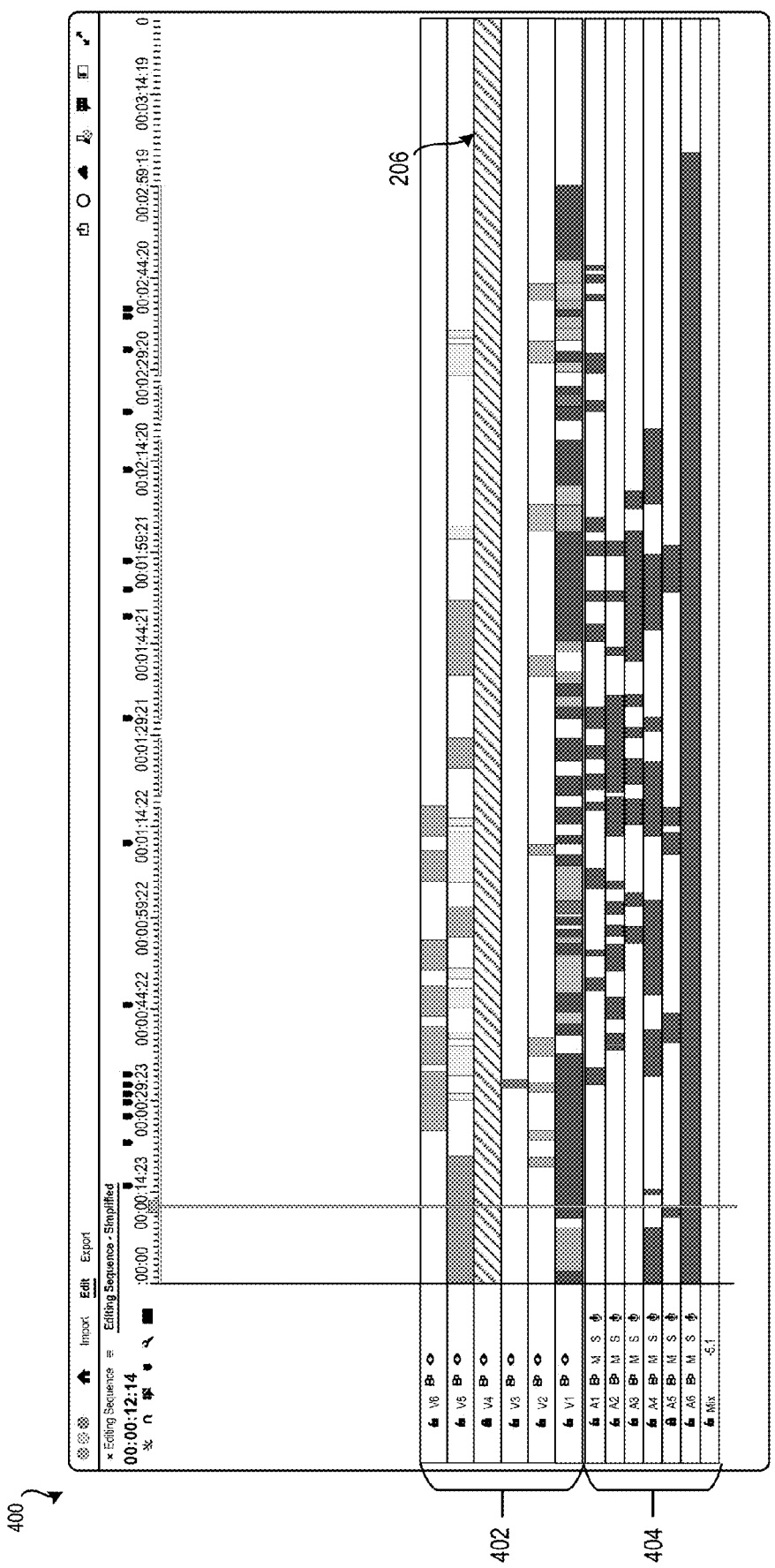
FIG. 4 illustrates an example modified editing sequence generated by the digital design system in accordance with one or more embodiments.

FIG. 4 illustrates an example modified editing sequence generated by the digital design system in accordance with one or more embodiments. The modified editing sequence depicted in FIG. 4 is the resulting output based on the editing sequence of FIG. 2 and the options selected in FIG. 3. As illustrated in FIG. 4, in the modified editing sequence 400, the plurality of video layers 402 has been reduced from ten video layers to six video layers, and the plurality of audio layers 404 has been reduced from eight audio layers to seven audio layers. Locked layer 206 is unmodified from the input editing sequence 200. Further, the editing sequence editing module 110 considers locked layer 206 as a floor for all layers above locked layer 206, allowing the video layers above locked layer 206 to be organized and simplified separately from the video layers below locked layer 206. The disabled video segments (e.g., 208A-208H) and the disabled audio segments (e.g., 210A-210D) have been removed.

Figure 5:
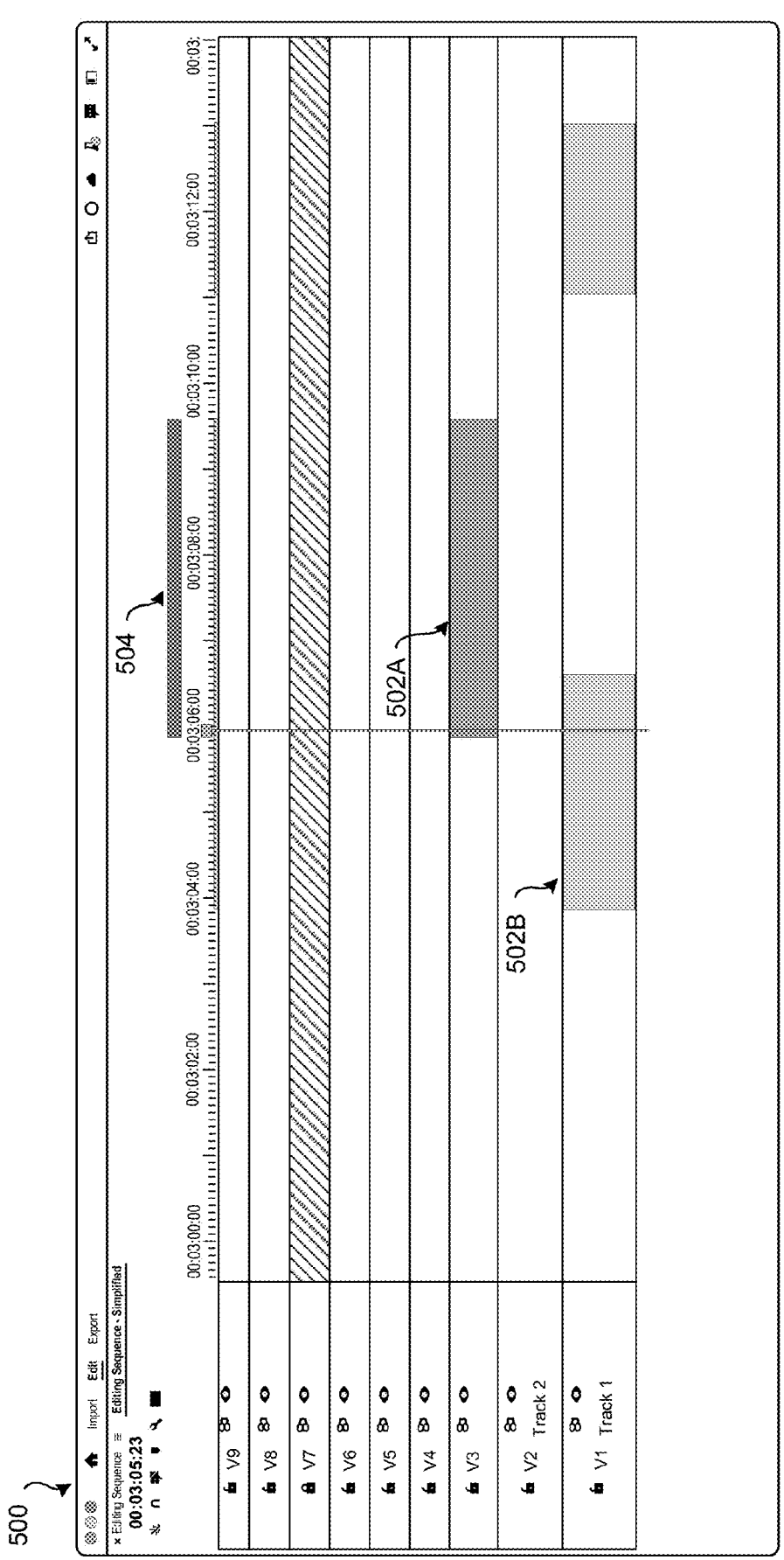
FIG. 5 illustrates an example modified editing sequence generated by the digital design system in accordance with one or more embodiments.

FIG. 5 illustrates an example modified editing sequence 500 generated by the digital design system in accordance with one or more embodiments. As illustrated in FIG. 5, the portion of the modified editing sequence 500 shown includes at least a first video segment 502A and a second video segment 502B. The first video segment 502A on a first video layer may be configured to have a linkage to a second video segment 502B on a second video layer. For example, a user can select the first video segment 502A and the second video segment 502B (and any other additional video segments) and link the selected video segments using a "Group" command or option. Because there is a linkage between the first video segment 502A and the second video segment 502B, if one or both of the video segments are moved to different video layers or if certain video layers are removed, the linkage would be broken or modified from the original intent. For example, the second video segment 502B may be removed or a different or no video segment may exist during those frames of the second video layer. In one or more embodiments, the digital design system can recognize such a linkage, and would not modify the editing sequence in such a way that the linkage would be broken or modified from its original intent. Instead, the digital design system can generate a notification that indicates the potential modification to the editing sequence and add a marker 504, or other type of indicator, at the start of the first and/or second video segments or spanning the first and/or second video segments. In one or more embodiments, the digital design system can also generate notifications or messages that provide a list of ambiguous modifications that were made to the editing sequence or areas of lower confidence that were not modified.

Figure 6:
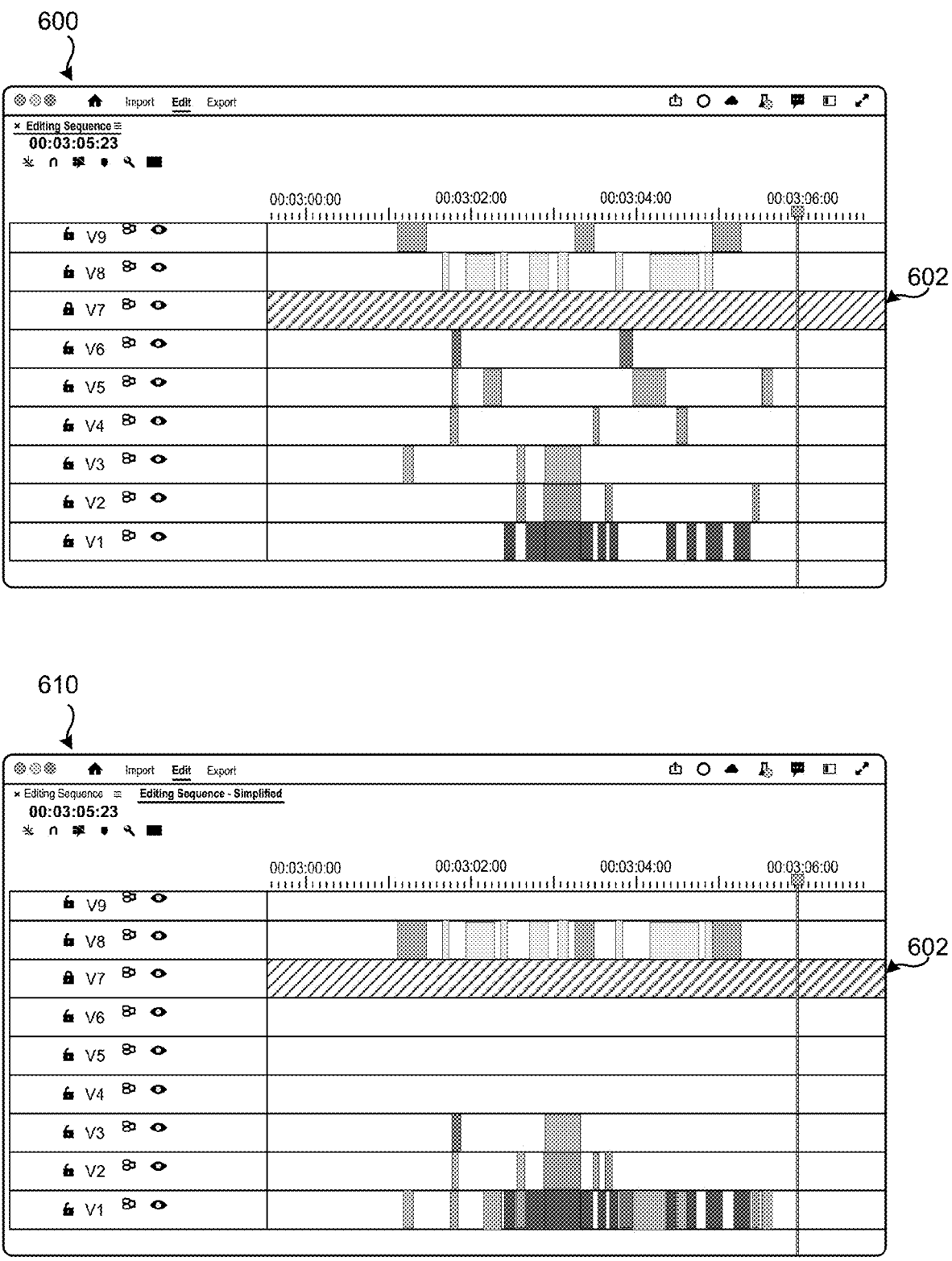
FIG. 6 illustrates an example modified editing sequence generated by the digital design system in accordance with one or more embodiments.

FIG. 6 illustrates an example modified editing sequence generated by the digital design system in accordance with one or more embodiments. As illustrated in FIG. 6, an editing sequence 600 includes nine video layers, including a locked video layer 602. Modified editing sequence 610 illustrates the modifications made to editing sequence 600 by the digital design system. The digital design system generates modified editing sequence 610 from editing sequence 600 based on receiving an option to "Close vertical gaps on video clips." The modified editing sequence 610 includes video segments/clips that were previously on video layers 4-6 moved down and arranged throughout video layers 1-3, as well as video segments/clips that were previously on video layer 9 moved down and arranged on video layer 8. The locked layer 602 is unmodified and acts as a floor for any video segments/clips above the locked layer 602, such that the video segments/clips on video layers 8-9 cannot be moved below the locked layer 602. The moved video segments/clips have been moved down to fill in gaps on lower video layers, but maintain the same timecodes.

Figure 7:
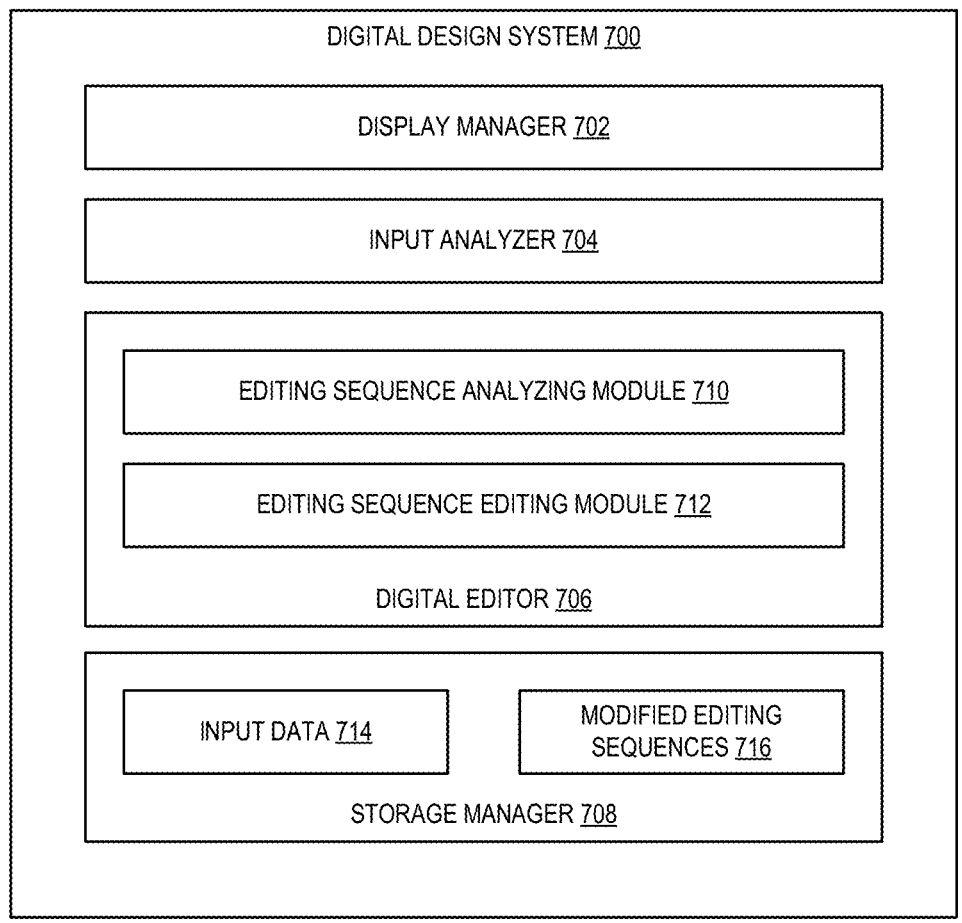
FIG. 7 illustrates a schematic diagram of a digital design system in accordance with one or more embodiments.

FIG. 7 illustrates a schematic diagram of a digital design system (e.g., "digital design system" described above) in accordance with one or more embodiments. As shown, the digital design system 700 may include, but is not limited to, a display manager 702, an input analyzer 704, a digital editor 706, and a storage manager 708. As shown, the digital editor 706 includes an editing sequence analyzing module 710, and an editing sequence editing module 712. The storage manager 708 includes input data database 714 and the modified editing sequences database 718.

As illustrated in FIG. 7, the digital design system 700 includes a display manager 702. In one or more embodiments, the display manager 702 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 702 may identify, display, update, or otherwise provide various user interfaces that include one or more display elements in various layouts.

In one or more embodiments, the display manager 702 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 7, the digital design system 700 also includes an input analyzer 704. The input analyzer 704 analyzes an input received by the digital design system 700 to identify an input editing sequence, and if provided in the input, a configuration for generating a modified editing sequence.

As further illustrated in FIG. 7, the digital design system 700 also includes a digital editor 706. In one or more embodiments, the digital editor 706 includes an editing sequence analyzing module 710 configured to analyze received or retrieved editing sequences that include layers of digital content (e.g., digital video, digital audio, digital images, etc.). For example, the editing sequence analyzing module 710 can be configured to identify empty tracks, disabled/muted track, disabled video and/or audio segments, etc., which can be removed based on user-defined configuration.

The editing sequence analyzing module 710 can also be configured to identify linkages between and/or characteristics of segments (e.g., transitions, through edits, etc.) that may be factors when determining how to modify the editing sequence based on the user-defined configuration.

As further illustrated in FIG. 7, the digital editor 706 includes an editing sequence editing module 712 configured to modify an editing sequence based on the analysis from the editing sequence analyzing module 710 and the user-defined configuration (e.g., selections received as input). Modifications to the editing sequence can include removing tracks/layers, audio and video segments, transitions, through edits, etc. Modification can also include removing segments that are not used for rendering and closing vertical gaps on video tracks.

As further illustrated in FIG. 7, the storage manager 708 includes input data database 714 and modified editing sequences database 716. In particular, the input data 714 may include input data received by the digital design system 700 indicating an input editing sequence, or a copy of the input editing sequence generated by the input analyzer 704. The modified editing sequences database 716 may include the modified editing sequences resulting from the process of simplifying the layers of digital content.

Each of the components 702-708 of the digital design system 700 and their corresponding elements (as shown in FIG. 7) may be in communication with one another using any suitable communication technologies. It will be recognized that although components 702-708 and their corresponding elements are shown to be separate in FIG. 7, any of components 702-708 and their corresponding elements may be combined into fewer components, such as into a single facility or module, divided into more components, or configured into different components as may serve a particular embodiment.

The components 702-708 and their corresponding elements can comprise software, hardware, or both. For example, the components 702-708 and their corresponding elements can comprise one or more instructions stored on a computer-readable storage medium and executable by processors of one or more computing devices. When executed by the one or more processors, the computer-executable instructions of the digital design system 700 can cause a client device and/or a server device to perform the methods described herein. Alternatively, the components 702-708 and their corresponding elements can comprise hardware, such as a special purpose processing device to perform a certain function or group of functions. Additionally, the components 702-708 and their corresponding elements can comprise a combination of computer-executable instructions and hardware.

Furthermore, the components 702-708 of the digital design system 700 may, for example, be implemented as one or more stand-alone applications, as one or more modules of an application, as one or more plug-ins, as one or more library functions or functions that may be called by other applications, and/or as a cloud-computing model. Thus, the components 702-708 of the digital design system 700 may be implemented as a stand-alone application, such as a desktop or mobile application. Furthermore, the components 702-708 of the digital design system 700 may be implemented as one or more web-based applications hosted on a remote server. Alternatively, or additionally, the components of the digital design system 700 may be implemented in a suit of mobile device applications or "apps." To illustrate, the components of the digital design system 700 may be implemented in a document processing application or an image processing application, including but not limited to ADOBE® PHOTOSHOP®, ADOBE® ILLUSTRATOR, ADOBE® PREMIERE® PRO, etc., or a cloud-based suite of applications such as CREATIVE CLOUD®. "ADOBE®," "PHOTOSHOP®," "ADOBE PREMIERE®," and "CREATIVE CLOUD®" are either a registered trademark or trademark of Adobe Inc. in the United States and/or other countries.

Figure 8:
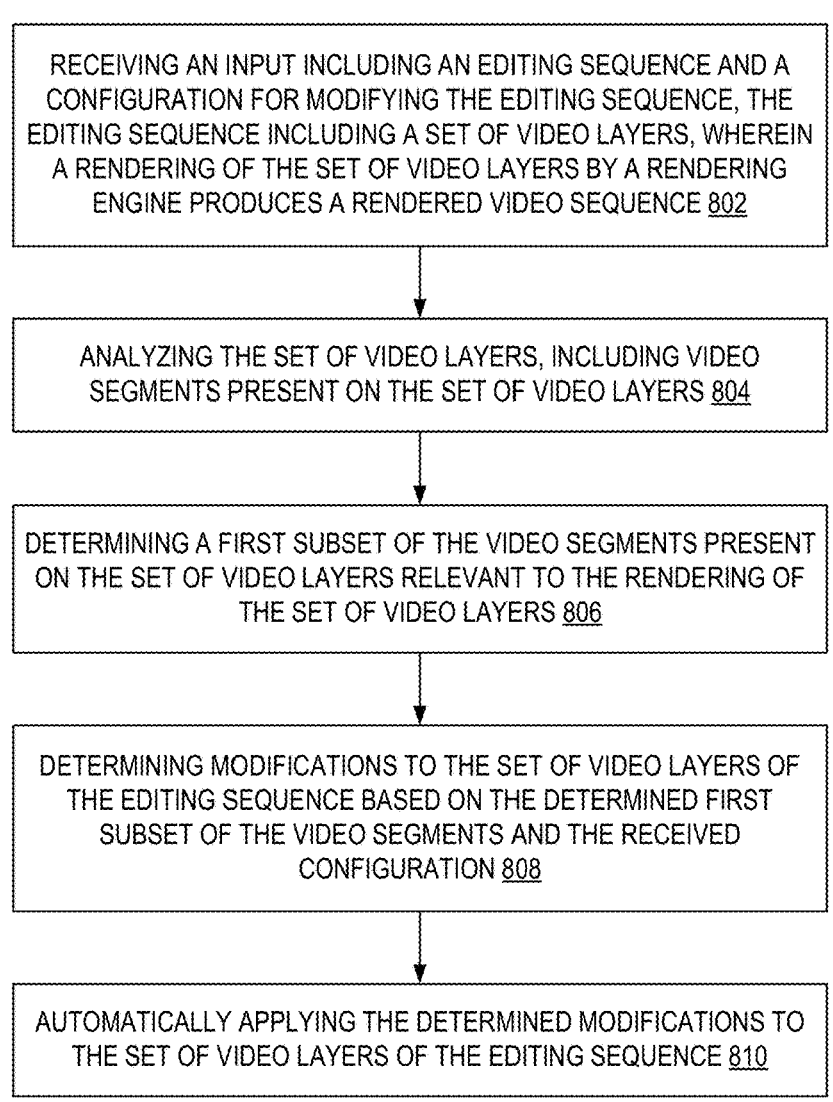
FIG. 8 illustrates a flowchart of a series of acts in a method of simplifying digital content layers of a multimedia editing sequence in accordance with one or more embodiments.

FIGS. 1-7, the corresponding text, and the examples, provide a number of different systems and devices that allow a digital design system to simplify digital content layers of a multimedia editing sequence. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method of simplifying digital content layers of a multimedia editing sequence in accordance with one or more embodiments. In one or more embodiments, the method 800 is performed in a digital medium environment that includes the digital design system 700. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving an input including an editing sequence and a configuration for modifying the editing sequence. The editing sequence includes a set of video layers, and a rendering of the set of video layers by a rendering engine produces a rendered video sequence. In one or more embodiments, the digital design system receives the input from a user (e.g., via a computing device). In one or more embodiments, the user may select the editing sequence in a video editing application, or the user may submit the editing sequence to a web service or an application configured to receive inputs.

As shown in FIG. 8, the method 800 also includes an act 804 of analyzing the set of video layers, including video segments present on the set of video layers. In one or more embodiments, prior to analyzing the editing sequence, the digital design system can generate a copy of the received editing sequence and perform subsequent operations of the method 800 on the copy of the editing sequence, and thus preserving the original editing sequence provided as input from being altered. Analyzing the editing sequence can include identifying the video layers and the video segments arranged on the video layers, including the characteristics of the video layers and video segments. For example, the digital design system identifies video segments that are disabled, video segments that have dependencies to other video segments, etc.

As shown in FIG. 8, the method 800 also includes an act 806 of determining a first subset of the video segments present on the set of video layers relevant to the rendering of the set of video layers. In one or more embodiments, determining the first subset of the video segments present on the set of video layers relevant to the rendering of the set of video layers includes a rendering engine identifying the first subset of the video segments used by the rendering engine in a rendering process producing the rendered video sequence. For example, a video segment at a higher layer of the editing sequence that is configured to be completely opaque would obscure any video segments, or any portions of video segments, that are within the same starting and ending timecodes as the video segment at the higher layer. Since they are completely obscured, and unless they have some linkage to another video segment, such video segments at the lower layers can be determined as being not relevant to the rendered video sequence. For example, for each frame of a plurality of frames of the editing sequence, the digital design system determines a subset of the set of video layers that would be used by the rendering engine during a rendering process to generate a rendered video sequence from the editing sequence.

As shown in FIG. 8, the method 800 also includes an act 808 of determining modifications to the set of video layers of the editing sequence based on the determined first subset of the video segments and the received configuration. Modifications to the editing sequence can include removing tracks/layers, removing audio and video segments, removing transitions, removing through edits, removing segments that are not used for rendering, and closing vertical gaps on video tracks.

In one or more embodiments, the digital design system determines that parameters for a first video segment on a first video layer include at least one dependency to a second video segment on a second video layer, and in response, generates an indicator on the editing sequence at a location associated with the first video segment. The indicator can include a notification indicating the at least one dependency. In one or more embodiments, because of the dependency, the digital design system may not modify or remove the first video segment or the second video segment. For example, when there is a linkage between video segments that could be broken by moving the video segments and/or altering layers, the digital design system can perform additional functionalities to preserve the linkage.

As shown in FIG. 8, the method 800 also includes an act 810 of automatically applying the determined modifications to the set of video layers of the editing sequence. In one or more embodiments, automatically applying the determined modifications to the set of video layers of the editing sequence includes removing existing empty or disabled layers and disabled video segments and closing vertical gaps. In one or more embodiments, vertical gaps between layers of the set of video layers are closed starting at a lowest level of the editing sequence and progressively up through higher levels of the editing sequence. In embodiments where the operations of method 800 are performed on a copy of the editing sequence, the determined modifications are applied to the copy of the editing sequence without causing any alterations to the input editing sequence. In such embodiments, performing the modifications on the copy of the editing sequence ensures that the process described in method 800 is non-destructive as to the input editing sequence.

The editing sequence can also include a set of audio layers (e.g., audio layers 204 in FIG. 2) that can be analyzed by the digital design system. In contrast to the video layers (e.g., videos layers 202 in FIG. 2) that are top-down starting at the highest video layer, audio layer are bottom-up starting at the lowest audio layer in the audio layers 204. Similar to the video layers, each audio layer can include one or more audio segments. In one or more embodiments, the digital design system identifies a subset of the set of audio layers having audio effects applied to the layers, such that any audio segments disposed on the subset of the set of audio layers would be subject to the audio effects. Audio effects can include distortion effect, volume adjustments, etc. These audio effects can be layer specific such that if any audio segments are moved from the audio layer having an audio effect applied, any moved audio segments would lose the audio effect, thereby modifying any outputted audio sequence from its designed intent. Similarly, any audio segments moved to the audio layer having an audio effect applied would have an added audio effect that was not intended. To prevent this, the digital design system locks, or effectively locks, the subset of the set of audio layers that have applied audio effects to prevent any modifications to those audio layers and any audio segments on those audio layers. The digital design system then determines modifications to the set of audio layers of the editing sequence, with the exclusion of the subset of the set of audio layer, based on the received configuration. For example, the digital design system can remove muted or disabled audio tracks/layers, muted or disable audio segments, etc. The digital design system can also close vertical gaps by moving audio segments that are located on audio layers that do not have any applied audio effects.

Figure 9:
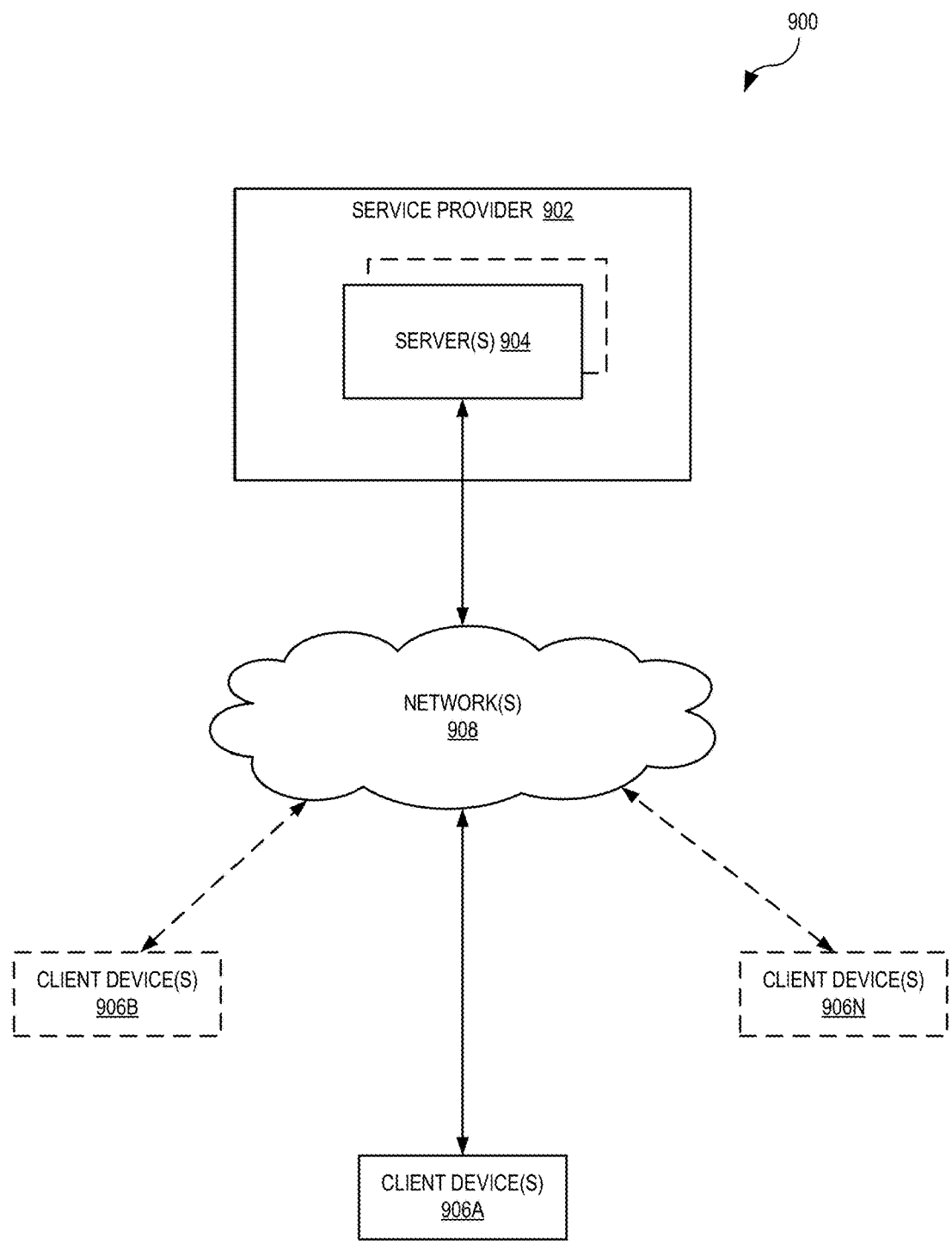
FIG. 9 illustrates a schematic diagram of an exemplary environment in which the digital design system can operate in accordance with one or more embodiments.

FIG. 9 illustrates a schematic diagram of an exemplary environment 900 in which the digital design system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the digital design system 700. In particular, the digital design system 700 may be implemented in whole or in part on the client device 906A. Alternatively, in some embodiments, the environment 900 is implemented in a distributed architecture across multiple computing devices.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access the service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including input data 714 and modified editing sequence data 716 or other information. For example, a server 904 may receive data from a client device, such as the client device 906A, and send the data to another client device, such as the client device 906B and/or 906N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the digital design system 700. In particular, the digital design system 700 can comprise an application running on the one or more servers 904 or a portion of the digital design system 700 can be downloaded from the one or more servers 904. For example, the digital design system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or web site hosted at the one or more servers 904.

Upon the client device 906A accessing a webpage or other web application hosted at the one or more servers 904, in one or more embodiments, the one or more servers 904 can provide a user of the client device 906A with an interface to provide inputs, including an editing sequence. Upon receiving the editing sequence, the one or more servers 904 can automatically perform the methods and processes described above to simply layers of digital content in an editing sequence.

As just described, the digital design system 700 may be implemented in whole, or in part, by the individual elements 902-908 of the environment 900. It will be appreciated that although certain components of the digital design system 700 are described in the previous examples with regard to particular elements of the environment 900, various alternative implementations are possible. For instance, in one or more embodiments, the digital design system 700 is implemented on any of the client devices 906A-906N. Similarly, in one or more embodiments, the digital design system 700 may be implemented on the one or more servers 904. Moreover, different components and functions of the digital design system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
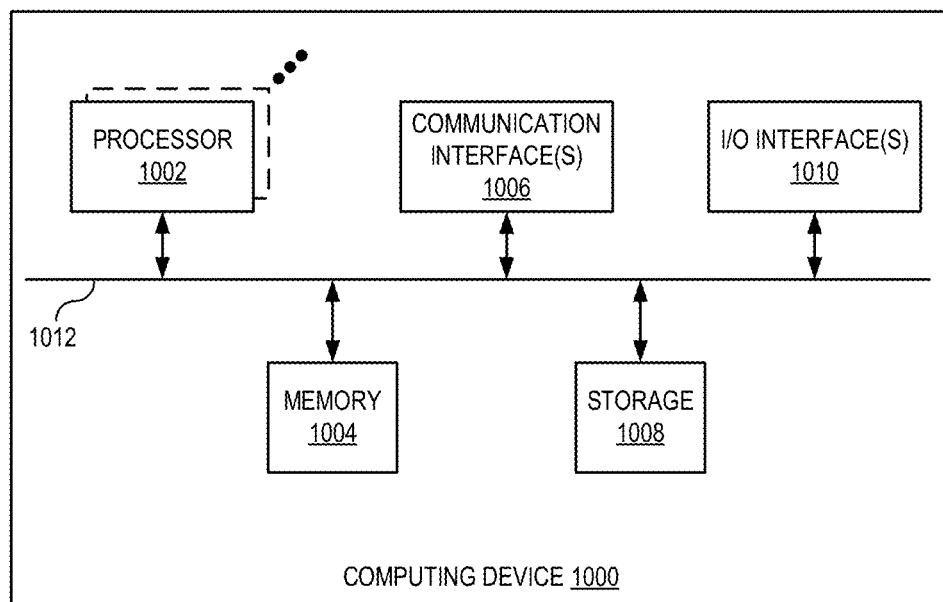
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the digital design system 700. As shown by FIG. 10, the computing device can comprise a processor 1002, memory 1004, one or more communication interfaces 1006, a storage device 1008, and one or more input or output ("I/O") devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more I/O devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving an input including an editing sequence and a configuration for modifying the editing sequence, the editing sequence including a set of video layers, wherein a rendering of the set of video layers by a rendering engine produces a rendered video sequence;
   analyzing the set of video layers, including video segments present on the set of video layers;
   determining a first subset of the video segments present on the set of video layers relevant to the rendering of the set of video layers;
   determining modifications to the set of video layers of the editing sequence based on the determined first subset of the video segments and the configuration; and
   automatically applying the determined modifications to the set of video layers of the editing sequence by closing vertical gaps between the set of video layers from a lowest level of the editing sequence up through higher levels of the editing sequence.

2. The computer-implemented method of claim 1, wherein determining the first subset of the video segments present on the set of video layers relevant to the rendering of the set of video layers comprises:
   identifying, by a rendering engine, the first subset of the video segments used by the rendering engine in a rendering process producing the rendered video sequence.

3. The computer-implemented method of claim 2, further comprising:
   flagging a second subset of video segments that are not used in the rendering process that outputs the rendered video sequence.

4. The computer-implemented method of claim 3, wherein the second subset of video segments includes one or more of: disabled video segments and video segments completely obscured by another video segment on a higher layer of the editing sequence.

5. The computer-implemented method of claim 1, wherein automatically applying the determined modifications to the set of video layers of the editing sequence comprises:
   removing existing empty or disabled layers and disabled video segments.

6. The computer-implemented method of claim 1, wherein determining the modifications to the set of video layers of the editing sequence based on the determined first subset of the video segments and the configuration comprises:
   determining that parameters for a first video segment on a first video layer include at least one dependency to a second video segment on a second video layer; and
   in response to determining that the parameters for the first video segment on the first video layer include the at least one dependency to the second video segment on the second video layer, generating an indicator on the editing sequence at a location associated with the first video segment, the indicator including a notification indicating the at least one dependency.

7. The computer-implemented method of claim 1, wherein the editing sequence includes a set of audio layers, each of the set of audio layers including one or more audio segments, the method further comprising:
   identifying a subset of the set of audio layers having audio effects applied to audio segments disposed on the subset of the set of audio layers;
   locking the subset of the set of audio layers; and
   determining modifications to the set of audio layers of the editing sequence, excluding the identified subset of the set of audio layers, based on the configuration.

8. A non-transitory computer-readable storage medium including instructions stored thereon which, when executed by at least one processor, cause the at least one processor to:
   receive an input including an editing sequence and a configuration for modifying the editing sequence, the editing sequence including a set of video layers, wherein a rendering of the set of video layers by a rendering engine produces a rendered video sequence;
   analyze the set of video layers, including video segments present on the set of video layers;
   determine a first subset of the video segments present on the set of video layers relevant to the rendering of the set of video layers;
   determine modifications to the set of video layers of the editing sequence based on the determined first subset of the video segments and the configuration; and
   automatically apply the determined modifications to the set of video layers of the editing sequence by closing vertical gaps between the set of video layers from a lowest level of the editing sequence up through higher levels of the editing sequence.

9. The non-transitory computer-readable storage medium of claim 8, wherein to determine the first subset of the video segments present on the set of video layers relevant to the rendering of the set of video layers, the instructions, when executed, further cause the at least one processor to:
   identify, by a rendering engine, the first subset of the video segments used by the rendering engine in a rendering process producing the rendered video sequence.

10. The non-transitory computer-readable storage medium of claim 9, wherein the instructions, when executed, further cause the at least one processor to:
    flag a second subset of video segments that are not used in the rendering process that outputs the rendered video sequence.

11. The non-transitory computer-readable storage medium of claim 10, wherein the second subset of video segments includes one or more of: disabled video segments and video segments completely obscured by another video segment on a higher layer of the editing sequence.

12. The non-transitory computer-readable storage medium of claim 8, wherein to automatically apply the determined modifications to the set of video layers of the editing sequence, the instructions, when executed, further cause the at least one processor to:

remove existing empty or disabled layers and disabled video segments.

13. The non-transitory computer-readable storage medium of claim 8, wherein to determine the modifications to the set of video layers of the editing sequence based on the determined first subset of the video segments and the configuration, the instructions, when executed, further cause the at least one processor to:
   determine that parameters for a first video segment on a first video layer include at least one dependency to a second video segment on a second video layer; and
   in response to determining that the parameters for the first video segment on the first video layer include the at least one dependency to the second video segment on the second video layer, generate an indicator on the editing sequence at a location associated with the first video segment, the indicator including a notification indicating the at least one dependency.

14. The non-transitory computer-readable storage medium of claim 8, wherein the editing sequence includes a set of audio layers, each of the set of audio layers including one or more audio segments, and wherein the instructions, when executed, further cause the at least one processor to:
   identify a subset of the set of audio layers having audio effects applied to audio segments disposed on the subset of the set of audio layers;
   lock the subset of the set of audio layers; and
   determine modifications to the set of audio layers of the editing sequence, excluding the identified subset of the set of audio layers, based on the configuration.

15. A system, comprising:
   a computing device including a memory and at least one processor, the computing device implementing a digital design system,
   wherein the memory includes instructions stored thereon which, when executed, cause the digital design system to:
      receive an input including an editing sequence and a configuration for modifying the editing sequence, the editing sequence including a set of video layers, wherein a rendering of the set of video layers by a rendering engine produces a rendered video sequence;
      analyze the set of video layers, including video segments present on the set of video layers;
      determine a first subset of the video segments present on the set of video layers relevant to the rendering of the set of video layers;
      determine modifications to the set of video layers of the editing sequence based on the determined first subset of the video segments and the configuration; and
      automatically apply the determined modifications to the set of video layers of the editing sequence by closing vertical gaps between the set of video layers from a lowest level of the editing sequence up through higher levels of the editing sequence.

16. The system of claim 15, wherein the instructions to determine the first subset of the video segments present on the set of video layers relevant to the rendering of the set of video layers, further causes the digital design system to:
   identify, by a rendering engine, the first subset of the video segments used by the rendering engine in a rendering process producing the rendered video sequence.

17. The system of claim 16, wherein the instructions, when executed, further cause the digital design system to:
   flag a second subset of video segments that are not used in the rendering process that outputs the rendered video sequence.

18. The system of claim 15, wherein the instructions to automatically apply the determined modifications to the set of video layers of the editing sequence, further causes the digital design system to:
   remove existing empty or disabled layers and disabled video segments.

19. The system of claim 15, wherein the instructions to determine the modifications to the set of video layers of the editing sequence based on the determined first subset of the video segments and the configuration, further causes the digital design system to:
   determine that parameters for a first video segment on a first video layer include at least one dependency to a second video segment on a second video layer; and
   in response to determining that the parameters for the first video segment on the first video layer include the at least one dependency to the second video segment on the second video layer, generate an indicator on the editing sequence at a location associated with the first video segment, the indicator including a notification indicating the at least one dependency.

20. The system of claim 15, wherein the editing sequence includes a set of audio layers, each of the set of audio layers including one or more audio segments, and wherein the instructions, when executed, further cause the digital design system to:
   identify a subset of the set of audio layers having audio effects applied to audio segments disposed on the subset of the set of audio layers;
   lock the subset of the set of audio layers; and
   determine modifications to the set of audio layers of the editing sequence, excluding the identified subset of the set of audio layers, based on the configuration.

* * * * *